US006263141B1

(12) United States Patent
Smith (10) Patent No.: US 6,263,141 B1
(45) Date of Patent: Jul. 17, 2001

(54) OPTICAL FIBER CABLE MANAGEMENT DEVICE INCLUDING STORAGE TRAY

(75) Inventor: Trevor Dean Smith, St. Louis Park, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/150,216

(22) Filed: Sep. 9, 1998

(51) Int. Cl.[7] .................................................. G02B 6/00
(52) U.S. Cl. ............................................................ 385/135
(58) Field of Search .................................. 385/135, 134, 385/136, 137

(56) References Cited

U.S. PATENT DOCUMENTS

| Re. 34,955 | 5/1995 | Anton et al. ............................ 385/53 |
| 4,359,262 | 11/1982 | Dolan . |
| 4,687,289 | 8/1987 | DeSanti . |
| 4,792,203 | 12/1988 | Nelson et al. . |
| 5,066,149 | 11/1991 | Wheeler et al. ....................... 385/135 |
| 5,074,635 | 12/1991 | Justice et al. ........................... 385/95 |
| 5,093,885 | 3/1992 | Anton ................................... 385/134 |
| 5,115,489 | 5/1992 | Norris ................................... 385/135 |
| 5,138,689 * | 8/1992 | Merlo et al. .......................... 385/135 |
| 5,142,606 * | 8/1992 | Carney et al. ........................ 385/134 |
| 5,208,894 | 5/1993 | Johnson et al. ....................... 385/135 |
| 5,247,603 | 9/1993 | Vidacovich et al. ................. 385/135 |
| 5,249,252 | 9/1993 | Noto ..................................... 385/135 |
| 5,402,515 | 3/1995 | Vidacovich et al. . |
| 5,481,639 | 1/1996 | Cobb et al. .......................... 385/135 |
| 5,511,144 | 4/1996 | Hawkins et al. ..................... 385/135 |
| 5,519,804 | 5/1996 | Burek et al. .......................... 385/135 |
| 5,613,030 * | 3/1997 | Hoffer et al. ......................... 385/135 |
| 5,717,811 | 2/1998 | Macken .................................. 385/135 |
| 5,917,984 * | 6/1999 | Roseler et al. ........................ 385/135 |
| 5,987,207 * | 11/1999 | Hoke ..................................... 385/135 |

FOREIGN PATENT DOCUMENTS

WO 95/07480 3/1995 (WO) .
WO 96/10203 4/1996 (WO) .

OTHER PUBLICATIONS

ADC Telecommunications FL2000 Splice Panel Installation Instructions, 12 pages, Issue 5, Jan. 1998.
ADC Telecommunications FlexLight 2000™ System Planning and Application Guide, 1st Edition, Issue 1, Apr. 1994, 44 pages.
ADC Telecommunications brochure entitled "AGX 72 Fiber Outside Plant Panel," 4 pages, dated Jan. 1995.
ADC Telecommunications catalog entitled "FL2000 System Second Edition," dated Jan. 1995, 43 pages.
ADC Telecommunications catalogue entitled "Fiber Panel Products Second Edition," 117 pages, dated Jul. 1996.

* cited by examiner

Primary Examiner—Rodney Bovernick
Assistant Examiner—Michael J. Stahl
(74) Attorney, Agent, or Firm—Merchant & Gould P.C.

(57) ABSTRACT

An optical fiber cable management device includes a housing and rotatable trays. The trays include a base, and various upstanding wall portions for defining cable guideways. Inner walls include curved segments. Four crescent shapes are provided for cable winding and cable protection. Various tabs extend from the wall portions and are spaced from the base to assist with cable positioning. The trays are symmetrical about a central axis extending parallel to the base. The housing further includes tray supports to support a free end of the trays during storage, and rotation out of the housing.

49 Claims, 9 Drawing Sheets

OPTICAL FIBER CABLE MANAGEMENT DEVICE INCLUDING STORAGE TRAY

FIELD OF THE INVENTION

The present invention is concerned with management of optical fiber cables. The management device of the present invention has particular application in the telecommunications industry with respect to storing excess cable lengths.

BACKGROUND OF THE INVENTION

Cable storage devices are known including, for example, a device shown in U.S. Pat. No. 4,792,203 issued to ADC Telecommunications, Inc. The device of U.S. Pat. No. 4,792,203 includes various features for organizing the fibers. One fiber organizing feature is two spools shaped to control the bend radii of the fibers so that the minimum bend radii is not exceeded. Storing excess lengths of fibers, organizing them and protecting them from damage is desired by the device. There is a continued need in the art for further management devices which address concerns in the telecommunications industry such as ease of use, size, reliability, cost, and protection of the fibers.

SUMMARY OF THE INVENTION

In one preferred embodiment, a cable management device is provided which includes a housing defining an enclosed interior. A movable door for accessing the interior is preferably provided. A tray is moveably mounted, such as by rotation, to the housing and disposed within the interior. The tray preferably has a pie-piece shape and includes a base having an apex area which defines a pivot axis, and a curved outer peripheral edge. Upstanding wall portions extend upwardly from the base and define selectable cable guideways. An access opening in the upstanding wall portions permits a cable to enter, and exit, the tray. An outside wall of the upstanding wall portions defines an enclosed interior. A plurality of centrally located, isolated inner walls of the upstanding wall portions are positioned on the base within the interior. A plurality of the inner walls have outwardly curved wall segments. At least one pair of inner walls is spaced from a further inner wall so as to provide the operator with selectable guideways for the cable length to be stored. Preferably, two pairs of the inner walls are arranged on opposite sides of the base such that the outwardly curved wall segments face in the same direction for each pair. Preferably, the curved inner walls include crescent shapes.

Preferably, the tray is symmetrical about a central axis through the apex and parallel to the base. Further auxiliary inner walls are provided to define additional cable guideways. The inner walls, and the outside wall may include tabs for assisting with cable positioning in the desired guideways.

In another arrangement, three inner walls with outwardly curved wall segments are positioned on one side of the tray, and at least one further inner wall with an outwardly curved wall segment is positioned at a spaced apart location from the first three.

A further aspect of the invention relates to one or more tray supports which support the outer peripheral edge of the tray during rotation. The tray supports are mounted to the housing. Preferably, plural tray supports are provided in a spaced apart manner to support the tray at several locations.

DETAILED DESCRIPTION OF THE PREFERRED EMBODIMENT

With reference to FIGS. 1–6, a cable management device 20 (hereinafter "device"), includes a housing 21 having a front 22, a back 24, a left side 26, a right side 28, a top 30, and a bottom 32. Device 20 allows for cables to enter device 20 for storage on one of rotatable trays 50. Device 20 also allows each cable to exit trays 50, if desired. Each tray 50 is rotatable from a storage position within housing 21 to an extended position. Tray 50a is shown in the extended position in FIGS. 1 and 2. In the extended positions, the features of each tray 50 are accessible by the operator. In the storage positions, each of the trays 50 are protectively contained within housing 21. Housing 21 can be made as desired, such as from sheet metal formed into appropriate pieces and held together by welding, fasteners or other known techniques.

Trays 50 each include operator selectable cable storage supports 89 for storing different cables having a plurality of different lengths. Through use of the selectable supports, the full length of the cable length to be stored is received by the tray, for organizing and protection by the tray during storage within housing 21. The operator selects which supports each cable is wound around and the number of windings in order to position the complete cable length on tray 50 for storage.

Device 20 is mountable to a bay or other frame structure via brackets 34, including holes 34a along left and right sides 26, 28. Front 22 is hinged to bottom 32 at hinge 42 to allow front access to an interior of device 20 where trays 50 are stored. A latch 44 selectively latches front 22 to top 30. Each of sides 26, 28 include rounded front edges 46 for protection of cables entering, and exiting, the individual trays 50. While front 22, including a hinged mounting, is preferred, an open housing 21 without any front is possible.

Trays 50 are mounted to housing 21 about a first pivot or rotation axis 52 for the trays 50 on the right side of housing 21, and about a second pivot or rotation axis 54 for the trays 50 mounted on the left side of housing 21. One or more plates or tabs (not shown) can extend from tray 50 to form a hinge with a hinge plate 202 (see left side in FIG. 1) and a hinge pin (not shown). An exemplary hinge mounting will be discussed below with reference to FIGS. 9 and 10.

While pivotal mountings of trays 50 are preferred, other moveable mountings instead of, or in addition to, are anticipated, such as sliding movement. Further, while two side-by-side stacks or arrays of separately moveable trays 50 are preferred, only one stack may be advantageously provided. Also, only one tray on each side of housing 21 may be provided. Further, a single tray 50 may be utilized, if desired.

Figure 3:
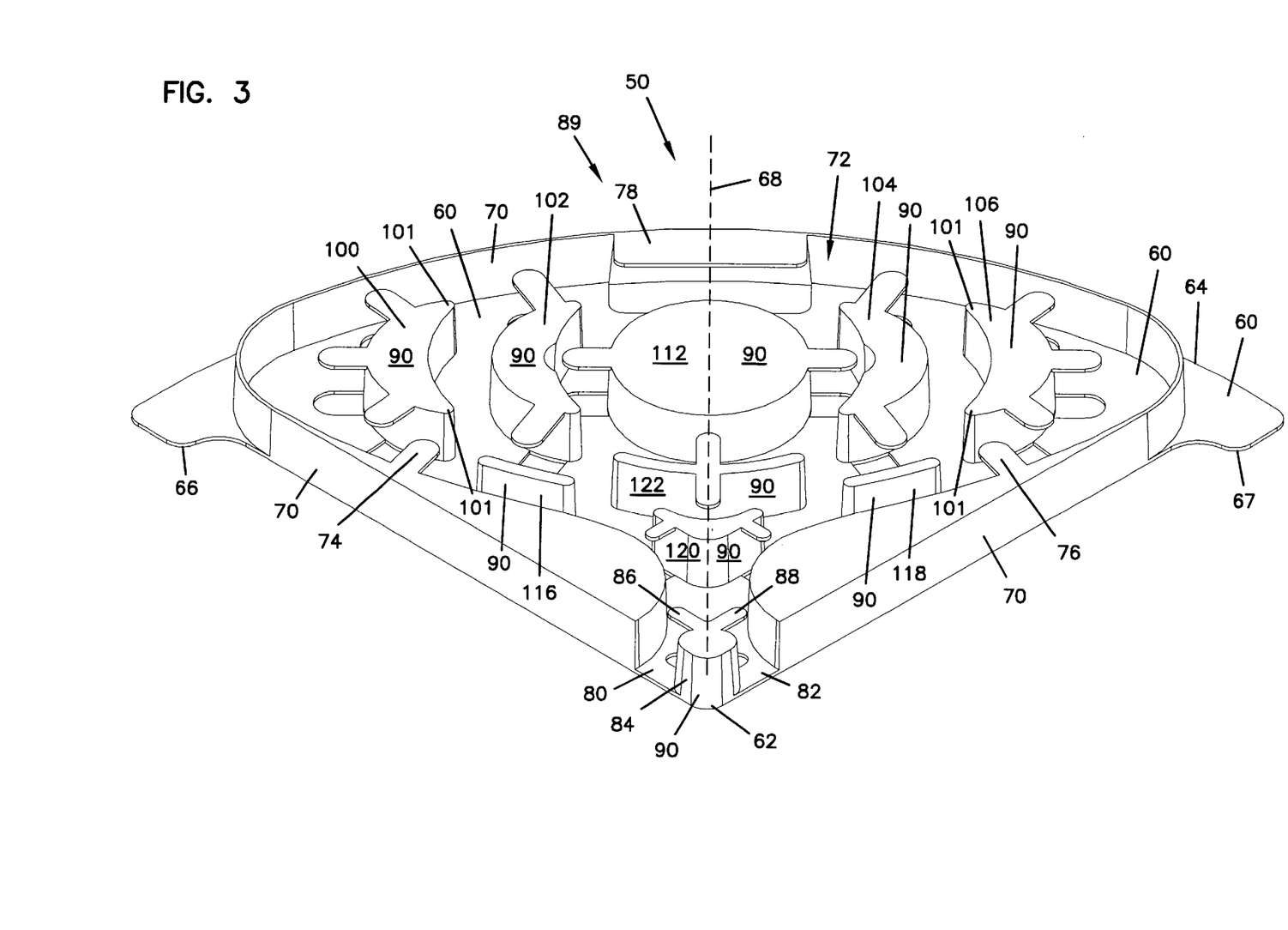
FIG. 3 is a top perspective view of one of the storage trays viewed from the apex area.
Figure 4:
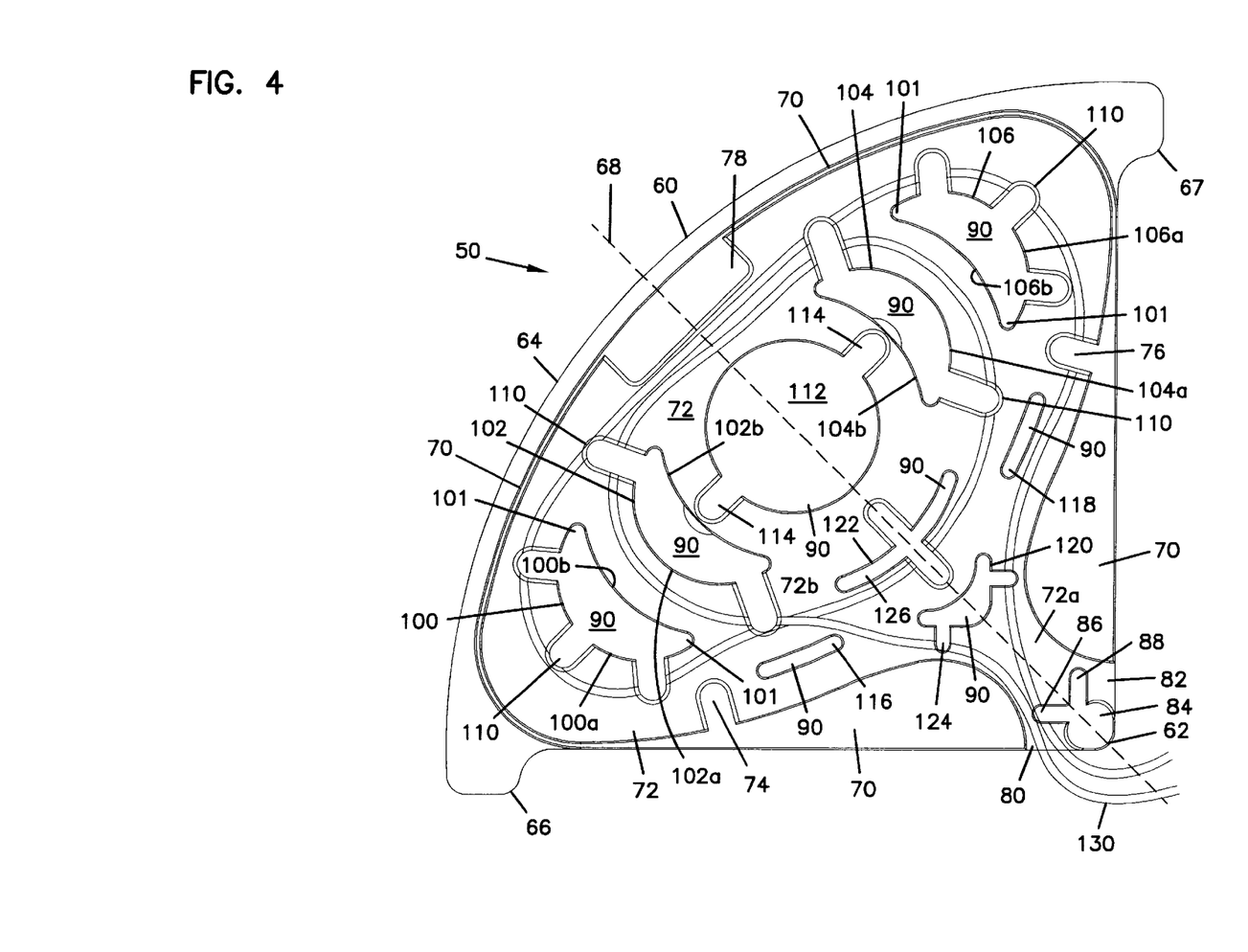
FIG. 4 is a top view of the storage tray of FIG. 3, and showing an example cable stored on the tray.

Now with particular reference to FIGS. 3 and 4, tray 50 includes a generally planar base 60, an apex area 62, and an outer peripheral edge or lip 64. The outer periphery of tray 50 defines a pie-piece shape. Base 60 of the illustrated embodiment generally defines a quarter pie-piece shape, with apex area 62 adjacent to a center point of a circle, and outer peripheral edge 64 defining a generally circularly shaped segment.

Base 60 further includes a finger tab 66 for convenient grasping by the operator to pull a selected tray 50 from within an interior of housing 21. Finger tab 67 is utilized when tray 50 is mounted on the left side of housing 21. In the preferred embodiment, tray 50 is symmetrical about a central axis 68 generally parallel to the direction of extension of base 60 through apex area 62. In this manner, identical trays 50 can be used to fill housing 21 on both the left and right sides. As best seen in the top view shown in FIG. 4, tray 50 generally defines a quarter pie shape bisected by central axis 68. Tray 50 is preferably made from a molded plastic material.

Supports 89 preferably include a plurality of upstanding wall portions extending upwardly from base 60, and tabs spaced from base 60. The upstanding wall portions and tabs define various cable supports and guideways for cable storage. An outside wall 70 defines an interior 72 for containing the stored cable. A plurality of tabs 74, 76, 78 spaced from base 60 extend inwardly from outside wall 70 to assist in cable positioning within the defined guideways. An access opening 80 allows the cable to enter tray 50 to reside in the interior 72 defined by outside wall 70. Access opening 80 also allows the cable to exit tray 50, if desired. A second access opening 82 is provided for the cable when tray 50 is positioned on a left side of housing 21.

In the illustrated preferred embodiment, an upstanding wall portion 84 defines an entry guidepost. Two tabs 86, 88 are provided for cable positioning. Channeled area 72a leads from access openings 80, 82 to a main interior 72b. Disposed in main interior 72b are a plurality of isolated inner walls 90 which divide main interior 72b into various separate cable guideways. Inner walls 90 can have various shapes, as desired for creating various cable guideways for storage of cables of different lengths and to protect the cable from damage. Such damage could come from bending the cable below its minimum bend radius. To accommodate cables of different lengths, it is preferable that a plurality of the inner walls 90 include at least one outwardly curved surface, such as a radius, and a further surface less than a radius in profile, such as a D-shape, or a crescent shape (concave and convex segments). Crescent shapes are shown in the preferred embodiment for at least some of the inner walls 90.

In the illustrated preferred embodiment of FIGS. 1–4, four crescent shaped inner walls 100, 102, 104, 106 are provided having convexly shaped outer surfaces 100a, 102a, 104a, and 106a. An opposing wall 100b, 102b, 104b, 106b of each inner wall 100, 102, 104, 106 is concavely shaped. The concave and convex surfaces connect at rounded corners 101. Preferably, inner walls 100, 102 are on one side of tray 50 relative to central axis 68, and inner walls 104, 106 are on an opposite side of tray 50. Each of inner walls 100, 102 and 104, 106 form pairs of inner walls where the respective convex and concave surfaces face in the same direction. Further, the concave surface of each pair of inner walls faces toward axis 68, and the convex surfaces face away, so as to define selectable supports and guideways for holding cables of widely varying lengths. The crescent shapes allow nesting of the inner walls to compactly store the cable. Preferably, each inner wall 100, 102, 104, 106 includes one or more tabs 110 spaced from base 60 for use in cable positioning on tray 50.

In the illustrated embodiment, tray 50 includes a cylindrically shaped and centrally located inner wall 112 as a further inner wall 90. Inner wall 112 preferably includes one or more cable positioning tabs 114. Further, auxiliary inner walls 116, 118, 120, 122 can be provided for additional cable positioning on tray 50. Each auxiliary inner wall 116, 118, 120, 122 may include cable positioning tabs 124, 126, as in the case of inner walls 120, 122. Some or all of inner walls 90 may be used to take up the full length of cable to be stored. Different lengths of cable may be stored in one or more different winding patterns, as long as the cable fits within tray 50 so that tray 50 can be positioned back inside housing 21, and the minimum bend radius is not exceeded.

As shown in FIG. 4, a length of cable 130 is allowed to enter tray 50 at access opening 80 and winds around the inner walls 90 in interior 72b so as to take up and securely store the desired excess length of cable without any sharp bends. Cable 130 then exits tray 50 at access opening 80. If cable 130 were a different length which needed storage on tray 50, a different winding pattern could be selected in order to securely hold cable 130 so that no extra cable hung loosely outside of tray 50. For example, a loop of cable could be made around circular inner wall 112. Multiple windings around inner walls 100, 102, 104, 106, 112 could be used. Including one or more auxiliary inner walls 116, 118, 120, 122 may also be advantageous for taking up the full cable length.

Figure 7:
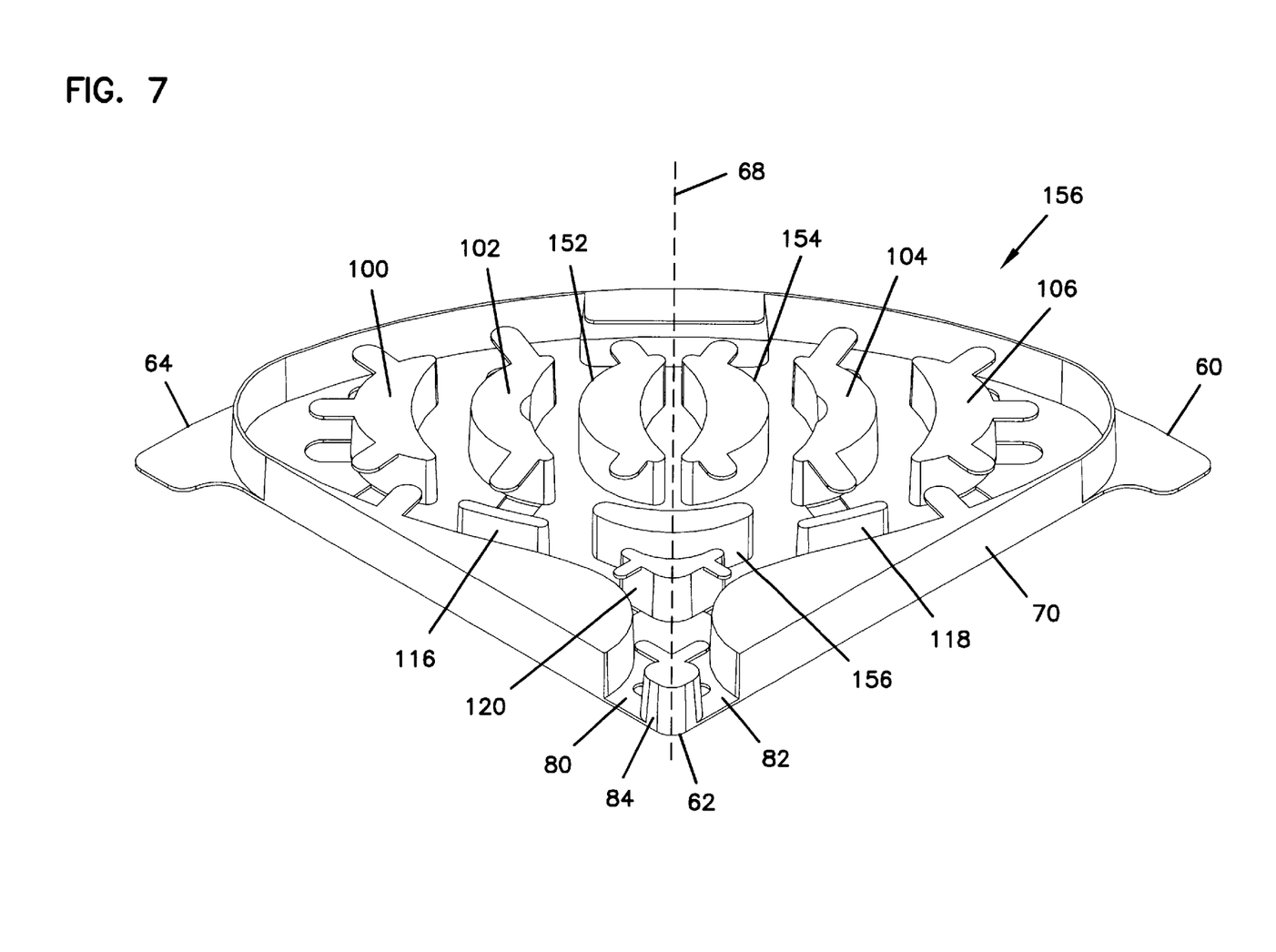
FIG. 7 is perspective view similar to the view of FIG. 3 of an alternative embodiment of a storage tray.
Figure 8:
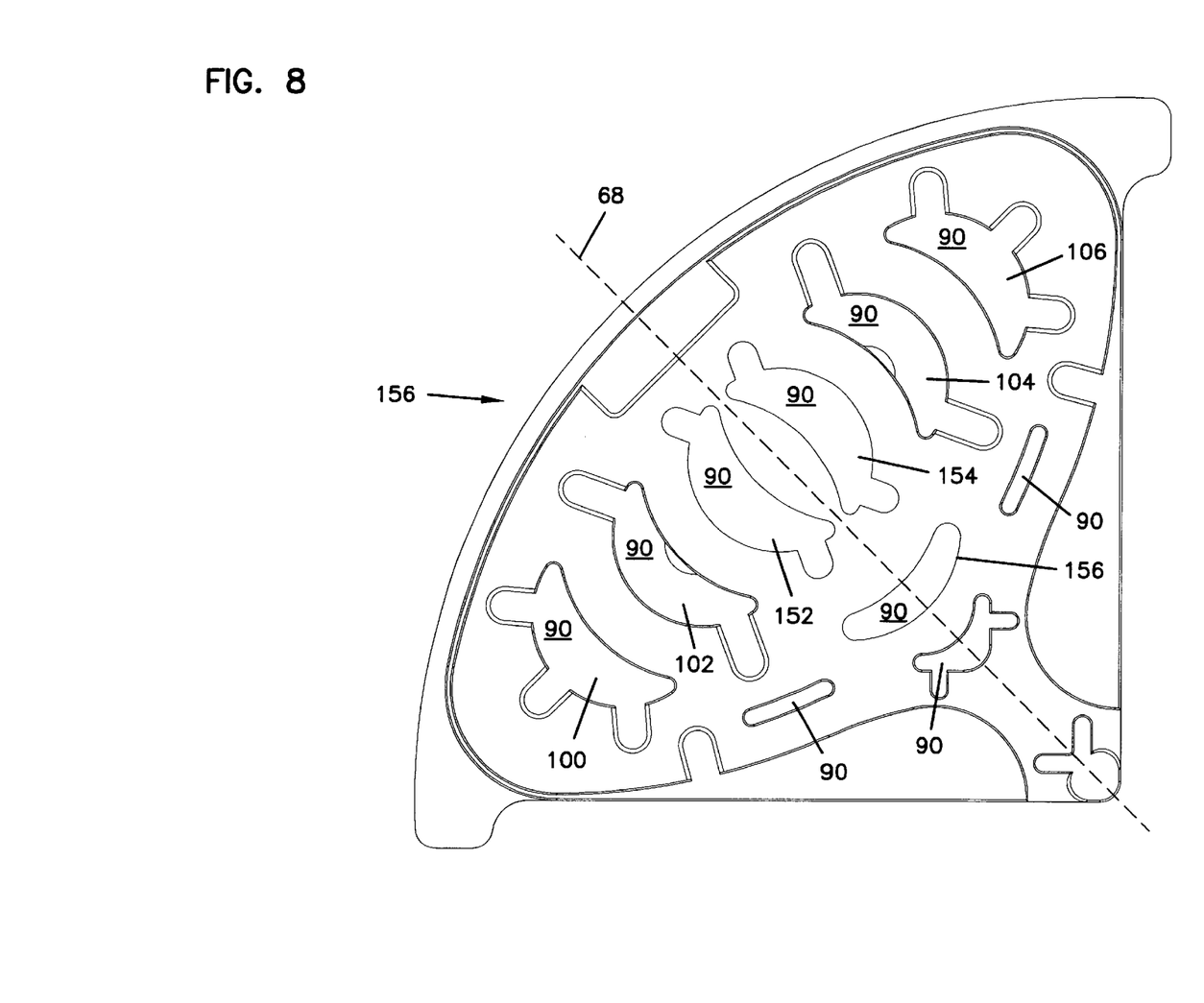
FIG. 8 is a top view of the storage tray shown in FIG. 7.

Referring now to FIGS. 7 and 8, an alternative embodiment of a tray 150 is shown. Like tray 50, tray 150 is symmetrical about central axis 68. However, instead of a cylindrical inner wall 112, two crescent shaped inner walls 152, 154 similar in shape and arrangement to inner walls 100, 102, 104, 106 are positioned on opposite sides of axis 68. Also, a modified inner wall 156 is provided, and does not include any tabs as inner wall 122 does in tray 50.

Further trays 50, 150 are anticipated, such as trays including differently shaped selectable arcuate segments for the inner walls 90 having curves shaped to protect the cable, and positioned on the tray to allow for different lengths to be wound around during storage without excess cable hanging loosely outside of housing 21. By providing arcuate shapes for inner walls 90 which are less than full circles in shape, a greater variety of cable lengths can be stored on tray 50 by selecting certain inner walls 90 for the various cable windings. For example, the two pairs of inner walls 90 in FIGS. 1–6, and the two sets of three inner walls 90 in FIGS. 7 and 8 are advantageously arranged for the operator to select appropriate guideways between or around curved inner walls 90, and any auxiliary inner walls to store the full length of the cable. A further arrangement may include two, three or four, etc. curved inner walls 90 on one side of tray 50, and one, two or three, etc. curved inner walls 90 on an opposite side, creating the selectable guideways for the operator. This unbalanced design is nonetheless advantageous for storing a full cable length, even though the design may not be symmetrical about any axis. While outside wall 70, and inner walls 90 are shown vertically with the cable positioning tabs extending transversely and parallel to the base, the walls and tabs could also be constructed together with a concave shape which supports the cable windings, and also provides for cable positioning in the trays 50, 150.

Figure 1:
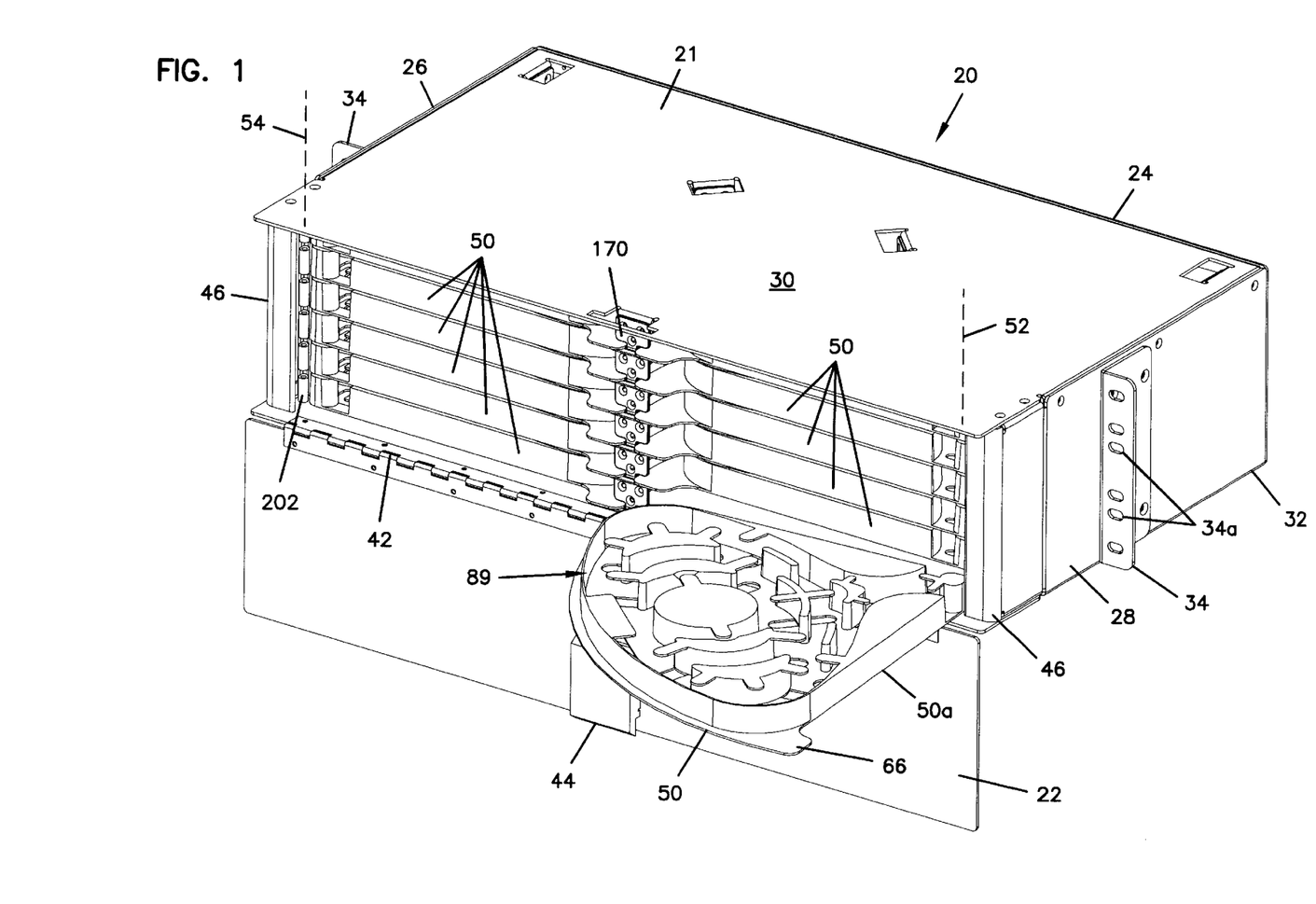
FIG. 1 is a front, top, and right side perspective view of an embodiment of a cable management device in accordance with the present invention, and showing one storage tray rotated out of the interior of the housing.
Figure 2:
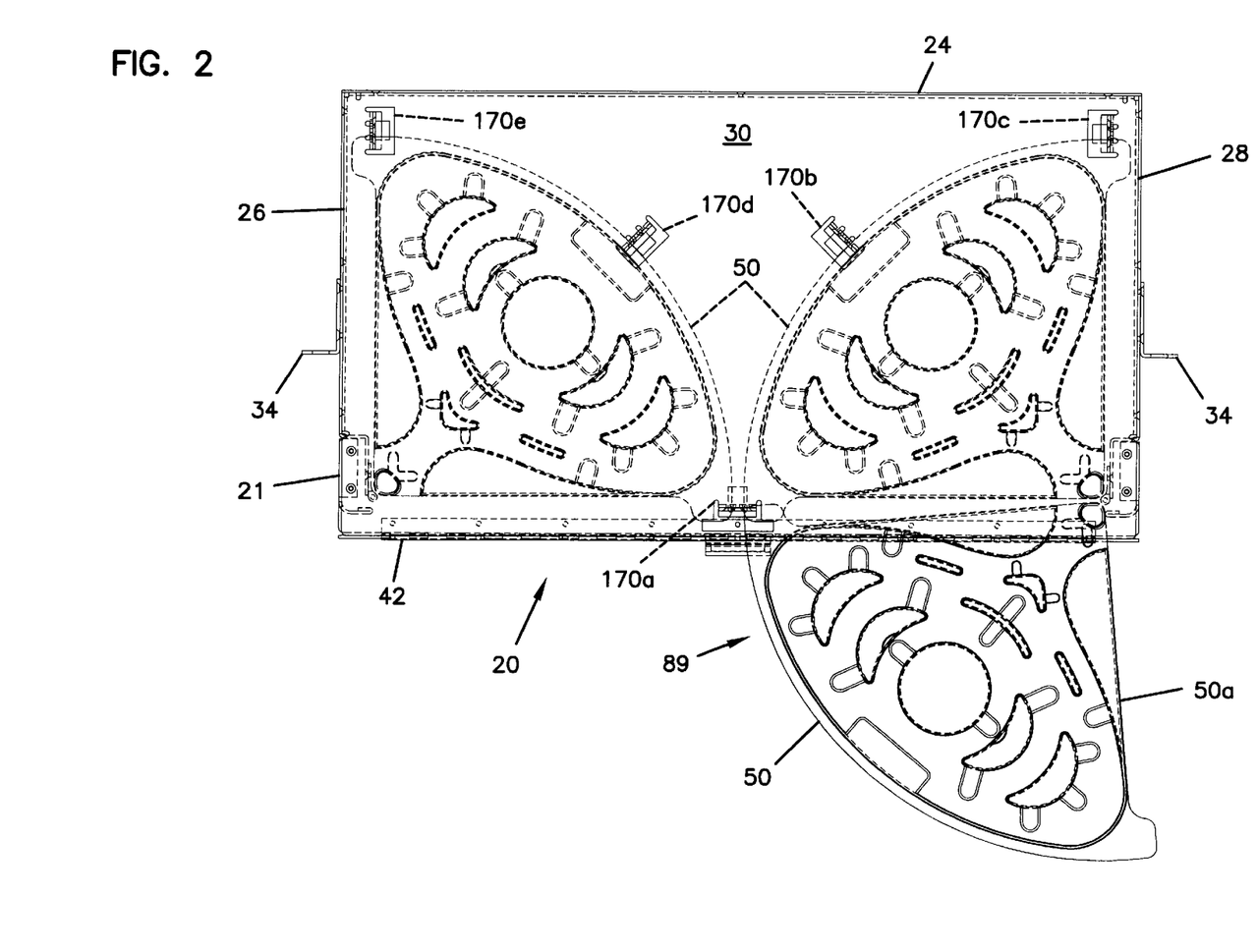
FIG. 2 is a top view of the cable management device of FIG. 1, showing features of the trays within the housing in dashed lines.
Figure 5:
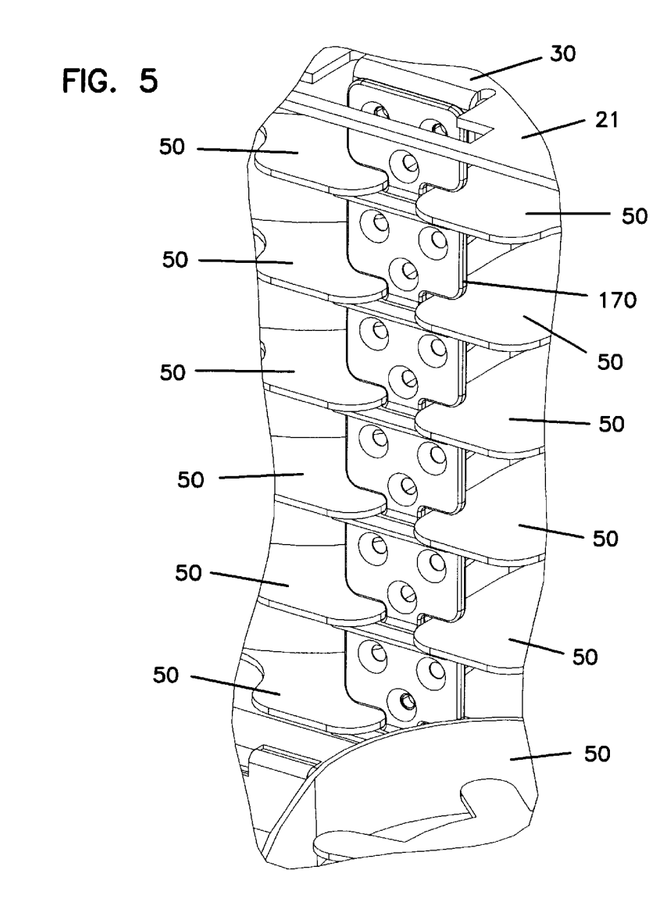
FIG. 5 is an enlarged view of a central portion of the housing shown in FIG. 1, showing the front tray support supporting left and right trays.
Figure 6:
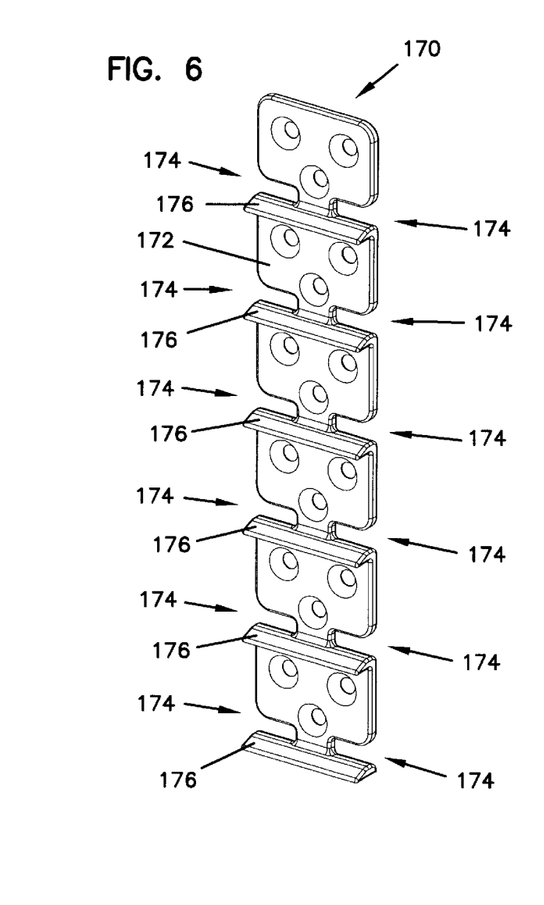
FIG. 6 is a perspective view of the tray support shown in FIG. 5.
Figure 9:
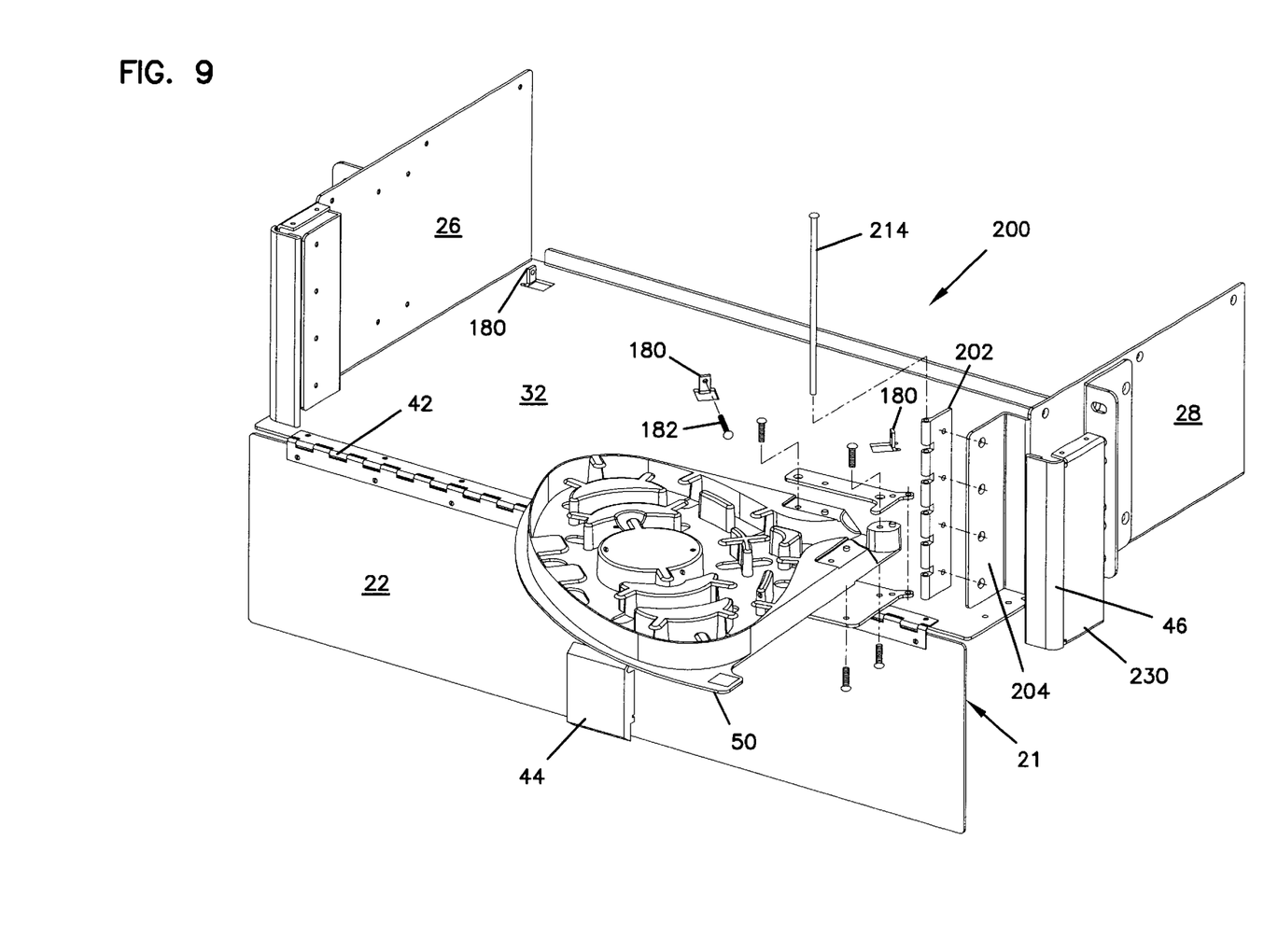
FIG. 9 is an exploded perspective view of the device of FIG. 1, showing details of an example hinge, the tray support mounts, and the rounded front edges of the sides of the housing.
Figure 10:
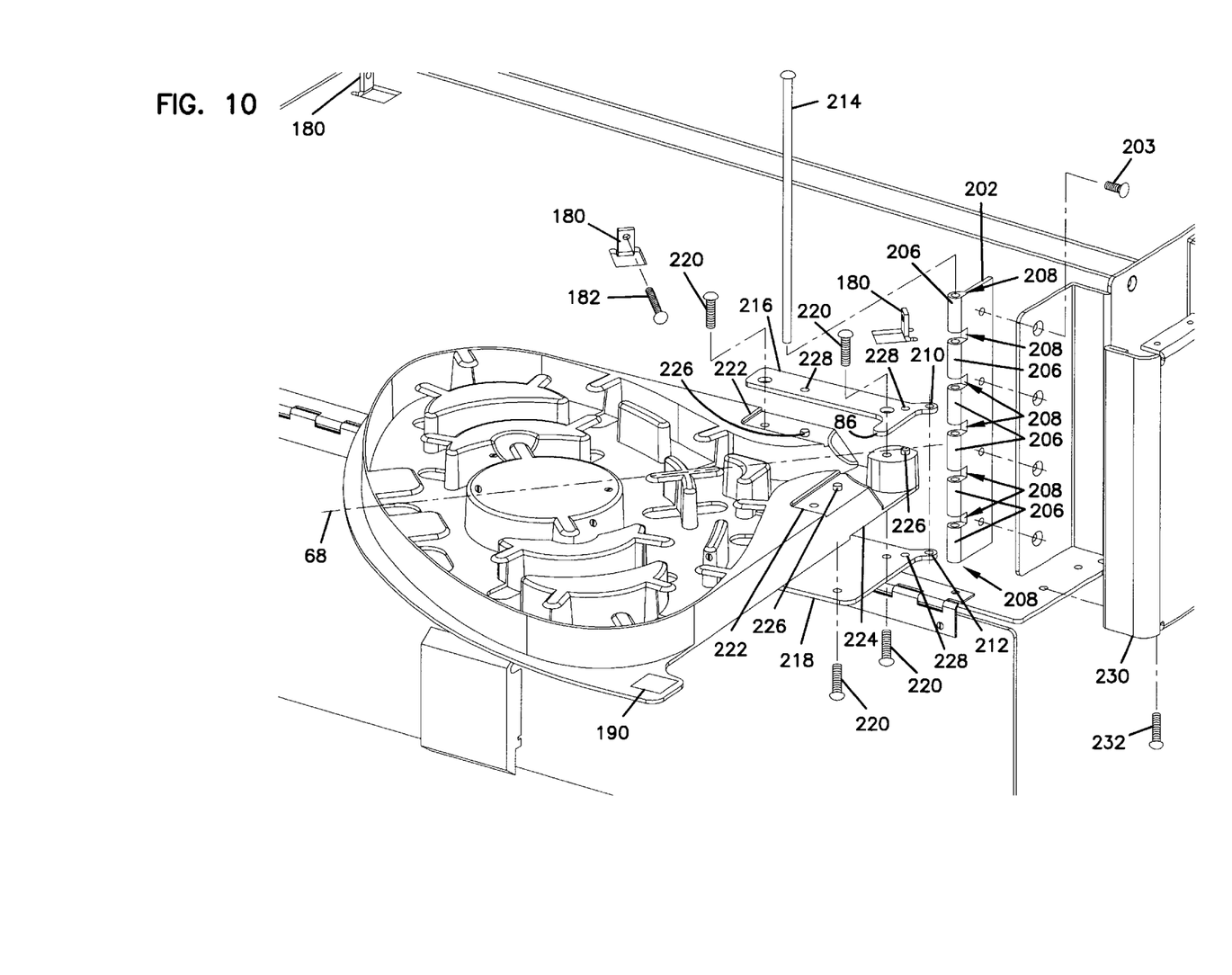
FIG. 10 is an enlarged perspective view of FIG. 9.

Referring now to FIGS. 5 and 6, a tray support 170 is shown in greater detail. Tray support 170 is in the form of a vertical post mounted to housing 21. Housing 21 includes a plurality of tray supports 170 in locations which support trays 50 during movement. Each tray support 170 includes a vertical face 172 and a plurality of side supports, defined by slots 174 in the embodiment shown. Each slot 174 has a rounded lower edge 176. In the preferred embodiment, support post 170 includes two rows of support members defined by the vertical slots 174 on opposite sides of vertical face 172. Preferably, a plurality of tray supports 170 are used in housing 21 to support the individual trays 50 away from pivot axes 52, 54. As shown in FIG. 2, three tray supports 170a, 170b, 170c are utilized to support the trays 50 on the right side of housing 21. Two additional tray supports 170d, 170e are provided, which along with the front tray support 170a, support trays 50 positioned on the left side of housing 21. Front tray support 170a is mounted to top and bottom 30, 32 of housing 21. Similarly, middle tray supports 170b, 170d and rear tray supports 170c, 170e are also mounted to top 30 and bottom 32 of housing 21. Tray supports 170 keep trays 50 from sagging at the peripheral edges 64, and reduce excessive forces at the hinge. FIGS. 9 and 10 show tray support mounts 180 on bottom 32 for mounting the tray supports 170 with fasteners 182. Similar mounts are provided on top 30.

Referring now to FIGS. 9 and 10, details of an example hinge 200 for mounting trays 50 is shown in greater detail. While some of the details shown in FIGS. 9 and 10 are not shown in FIGS. 1–6, it is to be appreciated that hinge 200 is useable as part of device 20 in FIGS. 1–6. A first difference between FIGS. 1–6 and FIGS. 9 and 10 is that tabs 86, 88 are formed by a separate plate 216, such as metal. Tab 88 is formed by flipping plate 216 about axis 68. A second difference is that finger tab 66 is shown with raised gripping portions 190.

Hinge 200 of FIGS. 9 and 10 includes a side hinge plate 202 mounted with fasteners 203 to a side plate portion 204 of side 28 of housing 21. Side hinge plate 202 includes a plurality of spaced apart cylindrical segments 206, defining spaces 208 therebetween. End spaces 208 are also provided between top and bottom 30, 32 and the respective top and bottom segments. Tray 50 includes top and bottom tabs 210, 212 which are received in two adjacent spaces 208. Hinge pin 214 is received in an aperture in cylindrical segments 206, and in each of top and bottom tabs 210, 212. Hinge pin 214 defines right side pivot axis 52. In the illustrated embodiment of tray 50, top and bottom tabs 210, 212 are formed by separate plates 216, 218 mounted to tray 50 with fasteners 220. Plates 216, 218 reside in recesses 222, 224, respectively in tray 50. Tray 50 further includes locating bosses 226 which fit into apertures 228 in each of plates 216, 218. Bottom plate 218 is mounted in the same position for the left or right trays 50. Top plate 216 is mounted in one of two positions, depending whether it is a left or right tray. As noted above, top plate 216 forms tab 86, or tab 88 for trays 50 mounted on left side of device 20.

FIGS. 9 and 10 also illustrate a separate side piece 230 which forms rounded side edge 46. Side piece 230 is mounted with fasteners 232 to top and bottom 30, 32.

The above specification and examples provide a complete description of the manufacture and use of the invention. Since many embodiments of the invention can be made without departing from the spirit and scope of the invention, the invention resides in the claims hereinafter appended.

What is claimed is:

1. An optical fiber cable management device comprising:
   a housing defining an enclosed interior; and
   a tray mounted to the housing and disposed within the interior, the tray moveable relative to the housing, wherein the tray is outside the interior of the housing after the tray is moved relative to the housing, the tray including:
   (a) a base; and
   (b) upstanding wall portions extending upwardly from the base, the wall portions defining:
   (1) at least one access opening for cable entering the tray;
   (2) an outside wall defining an inner cable guideway;
   (3) a plurality of spaced apart inner walls within the inner cable guideway, at least four of the inner walls having convexly curved wall segments, a first pair of the four inner walls positioned adjacent to one another and having the convexly curved wall segments facing in an opposite direction to the direction faced by the convexly curved wall segments of a second pair of the four inner walls positioned adjacent to one another, each of the first and second pairs of inner walls defining a cable guideway between each pair of inner walls;
   (4) a plurality of tabs extending inwardly from the outside portion and spaced from the base; and
   (5) a tab extending from at least one inner wall of each pair and spaced from the base;
   (6) wherein the tray is rotatably mounted to the housing about an axis generally transverse to the base.

2. The cable management device of claim 1, wherein the housing includes a moveable door, the interior accessible through the moveable door.

3. The cable management device of claim 1, wherein the tray has a central axis extending parallel to the base through the axis, and wherein the tray is symmetrical about the central axis.

4. The cable management device of claim 1, wherein the tray is a first tray, and the axis is a first axis, and further comprising a second tray mounted to the housing and disposed within the interior, the second tray rotatable relative to the housing in an opposite direction to the first tray about a second axis parallel to the first axis.

5. The cable management device of claim 4, wherein the first tray is part of a first array of trays stacked vertically, each tray in the first array separately rotatable, and wherein the second tray is part of a second array of trays stacked vertically, each tray in the second array separately rotatable.

6. The cable management device of claim 5, wherein each tray has a central axis extending parallel to the base through the respective first and second axes of rotation, and wherein each tray is symmetrical about the central axis.

7. The cable management device of claim 5, wherein the base of each tray includes a curved peripheral edge spaced from the pivot axis, and further comprising a plurality of the trays, the trays stacked vertically for independent rotation, wherein the housing includes a tray support including a plurality of support members, each support member receiving the curved peripheral edge of one of the trays during rotation of each tray.

8. An optical fiber cable management device comprising:
   a housing defining an enclosed interior; and a tray mounted to the housing and disposed within the interior, the tray moveable relative to the housing, wherein the tray is outside the interior of the housing after the tray is moved relative to the housing, the tray including:
  (a) a base; and
  (b) upstanding wall portions extending upwardly from the base, the wall portions defining:
    (1) at least one access opening for cable entering the tray;
    (2) an outside wall defining an inner cable guideway;
    (3) a plurality of spaced apart inner walls within the inner cable guideway, at least four of the inner walls having convexly curved wall segments, three of the four inner walls positioned adjacent to one another and having convexly curved wall segments facing in an opposite direction to the direction faced by the convexly curved wall segment of the fourth inner wall, wherein a cable guideway is defined between adjacent inner walls of the three inner walls;
    (4) a plurality of tabs extending inwardly from the outside wall and spaced from the base; and
    (5) a tab extending from at least one inner wall of each pair and spaced from the base;
    (6) wherein the tray is rotatably mounted to the housing about an axis generally transverse to the base.

9. The cable management device of claim 8, wherein the housing includes a moveable door, the interior accessible through the moveable door.

10. The cable management device of claim 8, wherein the tray is a first tray, and the axis is a first axis, and further comprising a second tray mounted to the housing and disposed within the interior, the second tray rotatable relative to the housing in an opposite direction to the first tray about a second axis parallel to the first axis.

11. The cable management device of claim 10, wherein the first tray is part of a first array of trays stacked vertically, each tray in the first array separately rotatable, and wherein the second tray is part of a second array of trays stacked vertically, each tray in the second array separately rotatable.

12. The cable management device of claim 11, wherein each tray has a central axis extending parallel to the base through the respective first and second axes of rotation, and wherein each tray is symmetrical about the central axis.

13. The cable management device of claim 11, wherein the base of each tray includes a curved peripheral edge spaced from the pivot axis, and further comprising a plurality of the trays, the trays stacked vertically for independent rotation, wherein the housing includes a tray support including a plurality of support members, each support member receiving the curved peripheral edge of one of the trays during rotation of each tray.

14. The cable management device of claim 8, wherein the tray has a central axis extending parallel to the base through the axis, and wherein the tray is symmetrical about the central axis.

15. An optical fiber cable management device comprising:
  a housing defining an enclosed interior, and a moveable door, the interior accessible through the moveable door; and
  a tray mounted to the housing and disposed within the interior, the tray rotatable relative to the housing, wherein the tray is outside the interior of housing after the tray is rotated relative to the housing, the tray including:
    (a) a pie-shaped base having an apex defining a rotation axis and a curved peripheral edge; and
    (b) upstanding wall portions extending upwardly from the base, the wall portions defining:
      (1) at least one access opening for a cable entering the tray;
      (2) an outside wall defining an inner cable guideway; and
      (3) a plurality of spaced apart inner walls within the inner cable guideway, at least four of the inner walls having crescent shapes with a convexly curved wall segment and an oppositely facing concavely curved wall segment, a first pair of the crescent shaped inner walls having the convexly curved wall segments facing in the same first direction, a second pair of the crescent shaped inner walls having the convexly curved wall segments facing in the same second direction, the first and second directions facing in opposite directions, each of the first and second pairs of crescent shaped inner walls defining a cable guideway between each pair of crescent shaped inner walls.

16. The cable management device of claim 15, wherein the tray is a first tray, and the rotation axis is a first rotation axis and further comprising a second tray mounted to the housing and disposed within the interior, the second tray rotatable relative to the housing in an opposite direction to the first tray about a second rotation axis parallel to the first rotation axis.

17. The cable management device of claim 16, wherein the first tray is part of a first array of trays stacked vertically, each tray in the first array separately rotatable, and wherein the second tray part of a second array of trays stacked vertically, each tray in the second array separately rotatable.

18. The cable management device of claim 15, wherein one of the inner walls defines a fifth inner wall having a generally circular shape, positioned between the two pairs of oppositely facing crescent shaped inner walls.

19. The cable management device of claim 18, wherein the tray has a central axis extending parallel to the base through the rotation axis, and wherein the tray is symmetrical about the central axis.

20. The cable management device of claim 15, wherein two of the inner walls define fifth and sixth inner walls each having crescent shapes with convexly curved wall segments facing in opposite directions and concavely curved wall segments facing each other, the fifth and sixth inner walls positioned between the two pairs of oppositely facing crescent shaped inner walls.

21. The cable management device of claim 20, wherein the tray has a central axis extending parallel to the base through the rotation axis, and wherein the tray is symmetrical about the central axis.

22. The cable management device of claim 15, further comprising a plurality of tabs extending inwardly from the outside wall, and spaced from the base.

23. The cable management device of claim 15, further comprising a tab extending from each inner wall, and spaced from the base.

24. The cable management device of claim 15, wherein the tray has a central axis extending parallel to the base through the rotation axis, and wherein the tray is symmetrical about the central axis.

25. The cable management device of claim 24, further comprising a plurality of auxiliary inner walls positioned generally between the apex and the pairs of oppositely facing crescent shaped inner walls.

26. The cable management device of claim 15, further comprising:
a plurality of tabs extending inwardly from the outside wall and spaced from the base;
a tab extending from each inner wall and spaced from the base;
the outside wall defining the access opening and a center post at the apex of the base.

27. The cable management device of claim 15, further comprising a plurality of the trays, the trays stacked vertically, wherein the housing includes a tray support including a plurality of slots, each slot receiving the curved peripheral edge of one of the trays during rotation of each tray.

28. An optical fiber cable management device comprising:
a housing defining an enclosed interior; and
a plurality of trays mounted to the housing and disposed within the interior in a vertically stacked arrangement, each tray individually rotatable relative to the housing, wherein each tray is outside the interior of housing after the respective tray is rotated relative to the housing, each tray including:
  (a) a pie-shaped base having an apex defining a rotation axis and a curved peripheral edge;
  (b) upstanding wall portions defining at least one access opening for cable entering the tray, and a cable guideway for cable storage;
a tray support extending vertically relative to the vertical stacked arrangement of the trays, the tray support including a plurality of support members, each support member receiving one of the curved peripheral edges of the trays during rotation of the trays relative to the housing.

29. The cable management device of claim 28, wherein the plurality of trays are a first array of trays, and further comprising a second array of trays mounted to the housing and disposed within the interior, the second array of trays each rotatable relative to the housing in an opposite direction to the first array of trays, and wherein the tray support is a first tray support and further comprising a second tray support for receiving the curved peripheral edges of the second array of trays, each of the trays of the first and second arrays of trays separately rotatable relative to one another.

30. The cable management device of claim 29, further comprising a plurality of spaced apart tray supports, wherein one of the tray supports holds trays from each of the first and second arrays of trays.

31. A cable management tray for use in a housing wherein the housing holds the tray for rotational movement, the tray comprising:
a generally planar base defining a rotation axis transverse to the base;
a plurality of cable guide surfaces extending upwardly from the base, the guide surfaces including:
  (a) a cable access guideway to enter the tray;
  (b) an outside wall defining an interior for cable storage;
  (c) a plurality of isolated extensions within the interior defined by the outside wall, each extension including a tab spaced from the base, each extension having a convexly shaped segment terminating at two corners, the extensions arranged in pairs disposed on opposite sides of the base, each pair having the convexly shaped segments facing in the same direction, wherein the base includes a central axis transverse to the rotation axis, and wherein the tray is symmetrical about the central axis.

32. A cable management tray for use in a housing wherein the housing holds the tray for rotational movement, the tray comprising:
a generally planar base defining a rotation axis transverse to the base;
a plurality of cable guide surfaces extending upwardly from the base, the guide surfaces including:
  (a) a cable access guideway to enter the tray;
  (b) an outside wall defining an interior for cable storage;
  (c) a plurality of isolated extensions within the interior defined by the outside wall, each extension including a tab spaced from the base, each extension having a convexly shaped segment terminating at two corners, the extensions arranged on the base wherein at least one of the convexly shaped segments faces in an opposite direction to the direction faced by at least two of the other convexly shaped segments.

33. A housing for an optical fiber cable management device, for housing rotatably mounted cable storage trays comprising:
a housing defining an enclosed interior, and a moveable door, the interior accessible through the moveable door;
two tray hinges for hingedly holding the trays in two vertical stacks; and
a tray support arrangement within the interior of the housing, the tray support arrangement including support surfaces for supporting the two stacks of rotatable trays during rotation of each tray relative to the housing, the support surfaces mounted to the housing, wherein the support surfaces support each tray along a curved peripheral edge of each tray disposed at a spaced apart location from a rotation axis of each tray, wherein each peripheral edge of each tray is slideably engaged by one of the support surfaces during rotation of each respective tray.

34. An optical fiber cable management device comprising:
a housing defining an enclosed interior; and
a tray mounted to the housing and disposed within the interior, the tray moveable relative to the housing, wherein the tray is outside the interior of the housing after the tray is moved relative to the housing, the tray including:
  (a) a base; and
  (b) upstanding wall portions extending upwardly from the base, the wall portions defining:
    (1) at least one access opening for cable entering the tray;
    (2) an outside wall defining an inner cable guideway;
    (3) a plurality of spaced apart inner walls within the inner cable guideway including: (i) a center circular wall portion defining a center of the tray; and (ii) aligned first and second pairs of crescent-shaped walls positioned adjacent to one another on the tray on opposite sides of the center circular wall portion with the center circular wall portion centered therebetween, the crescent-shaped walls of the first pair having a convexly curved wall segment facing in an opposite direction to the direction faced by a convexly curved wall segment of each crescent-shaped wall of the second pair, each of the first and second pairs of crescent-shaped walls defining a selectable cable pathway: (i) outside of the outer crescent-shaped wall of each pair; (ii) between each pair of crescent-shaped walls; and (iii) between the inner crescent-shaped wall of each pair and the center circular wall portion, thereby providing multiple pathways for storing various lengths of cable;

(4) a plurality of first tabs extending inwardly from the outside wall and spaced from the base;

(5) two second tabs extending outwardly from opposite sides of the center circular wall portion and spaced from the base and the inner crescent-shaped wall of each pair; and (6) at least one third tab extending outwardly from each crescent-shaped wall of each pair and spaced from the base and the other inner walls and the outside wall.

35. The cable management device of claim 34, wherein the housing includes a moveable door, the interior accessible through the moveable door.

36. The cable management device of claim 34, wherein the tray is rotatably mounted to the housing about an axis generally transverse to the base.

37. The cable management device of claim 36, wherein the tray is a first tray, and the axis is a first axis, and further comprising a second tray mounted to the housing and disposed within the interior, the second tray rotatable relative to the housing in an opposite direction to the first tray about a second axis parallel to the first axis.

38. The cable management device of claim 37, wherein the first tray is part of a first array of trays stacked vertically, each tray in the first array separately rotatable, and wherein the second tray is part of a second array of trays stacked vertically, each tray in the second array separately rotatable.

39. The cable management device of claim 38, wherein each tray has a central axis extending parallel to the base through the respective first and second axes of rotation, and wherein each tray is symmetrical about the central axis.

40. The cable management device of claim 38, wherein the base of each tray includes a curved peripheral edge spaced from the pivot axis, and further comprising a plurality of the trays, the trays stacked vertically for independent rotation, wherein the housing includes a tray support including a plurality of support members, each support member receiving the curved peripheral edge of one of the trays during rotation of each tray.

41. The cable management device of claim 36, wherein the tray has a central axis extending parallel to the base through the axis, and wherein the tray is symmetrical about the central axis.

42. An optical fiber cable management device comprising:

a housing defining an enclosed interior; and a tray mounted to the housing and disposed within the interior, the tray moveable relative to the housing, wherein the tray is outside the interior of the housing after the tray is moved relative to the housing, the tray including:

(a) a base; and (b) upstanding wall portions extending upwardly from the base, the wall portions defining:

(1) at least one access opening for cable entering the tray;

(2) an outside wall defining an inner cable guideway;

(3) a plurality of spaced apart inner walls within the inner cable guideway, the inner walls each having an inner concavely-curved wall segment and an outer convexly-curved wall segment of a lesser radius of curvature, wherein a curved end is formed on opposite ends of each inner wall where the inner concavely-curved wall segment and the outer convexly-curved wall segment of each of the inner walls intersect, a plurality of the inner walls disposed adjacent to one another having the outer convexly-curved wall segments facing in a first direction, at least one further inner wall being disposed relative to the plurality of the spaced apart inner walls facing the first direction such that its outer convexly-curved wall segment faces in a second opposite direction; further wherein each of the inner walls defines a selectable pathway for cable storage adjacent each outer convexly-curved wall segment;

(4) a plurality of first tabs extending inwardly from the outside wall and spaced from the base; and (5) a second tab extending from each outer convexly-curved wall segment and spaced from the base.

43. The cable management device of claim 42, wherein the housing includes a moveable door, the interior accessible through the moveable door.

44. The cable management device of claim 42, wherein the tray is rotatably mounted to the housing about an axis generally transverse to the base.

45. The cable management device of claim 44, wherein the tray is a first tray, and the axis is a first axis, and further comprising a second tray mounted to the housing and disposed within the interior, the second tray rotatable relative to the housing in an opposite direction to the first tray about a second axis parallel to the first axis.

46. The cable management device of claim 45, wherein the first tray is part of a first array of trays stacked vertically, each tray in the first array separately rotatable, and wherein the second tray is part of a second array of trays stacked vertically, each tray in the second array separately rotatable.

47. The cable management device of claim 46, wherein each tray has a central axis extending parallel to the base through the respective first and second axes of rotation, and wherein each tray is symmetrical about the central axis.

48. The cable management device of claim 46, wherein the base of each tray includes a curved peripheral edge spaced from the pivot axis, and further comprising a plurality of the trays, the trays stacked vertically for independent rotation, wherein the housing includes a tray support including a plurality of support members, each support member receiving the curved peripheral edge of one of the trays during rotation of each tray.

49. The cable management device of claim 44, wherein the tray has a central axis extending parallel to the base through the axis, and wherein the tray is symmetrical about the central axis.

* * * * *